Feb. 27, 1968 P. SCHIFF 3,371,276
APPARATUS RESPONSIVE TO RADIO FREQUENCY NOISE FOR
NON-DESTRUCTIVELY TESTING A REVERSELY BIASED
TRANSISTOR FOR SECOND BREAKDOWN
Filed Dec. 28, 1964 2 Sheets-Sheet 1

INVENTOR.
PETER SCHIFF
BY Edward J Norton
attorney

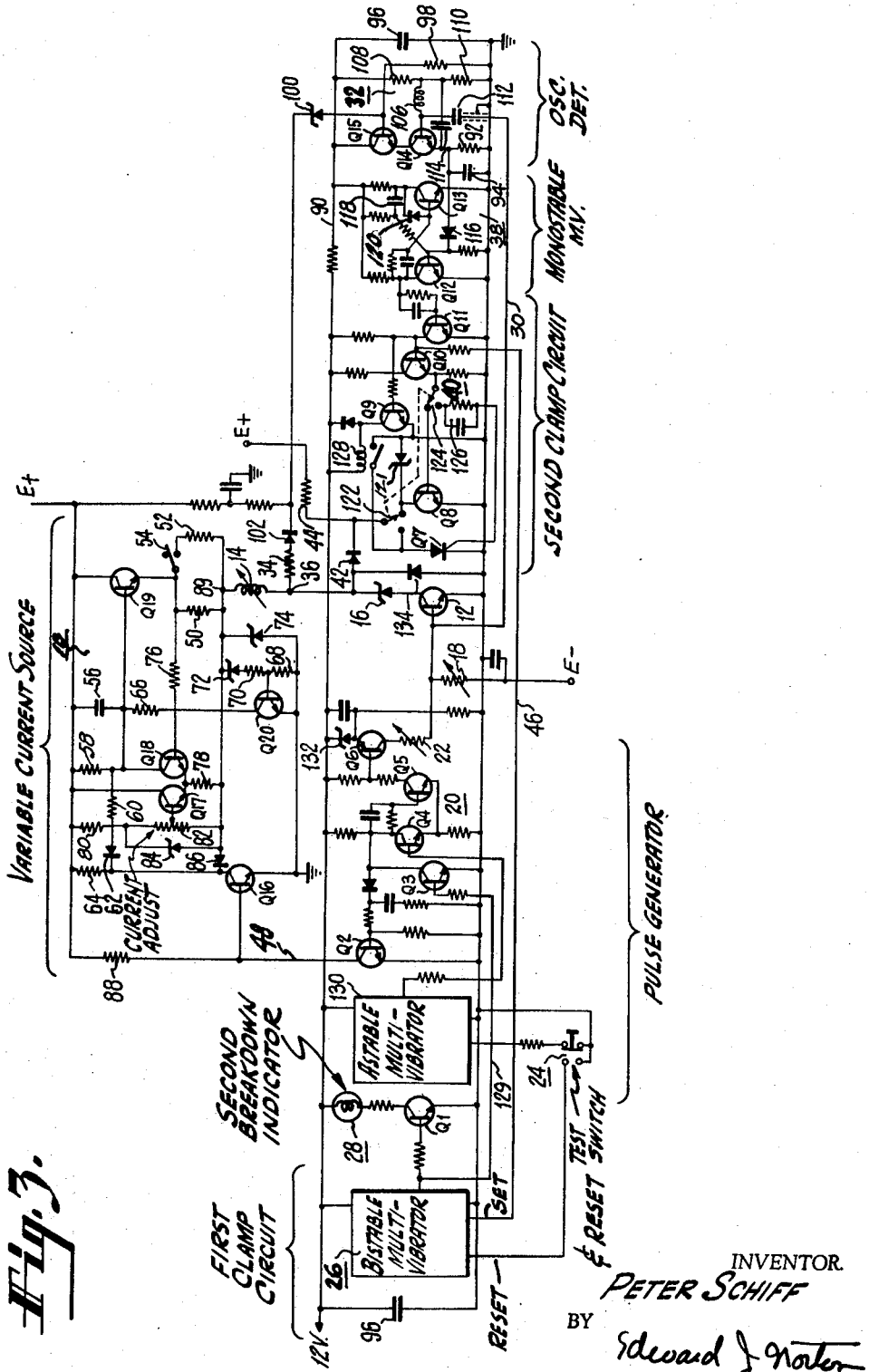

United States Patent Office 3,371,276
Patented Feb. 27, 1968

3,371,276
APPARATUS RESPONSIVE TO RADIO FREQUENCY NOISE FOR NON-DESTRUCTIVELY TESTING A REVERSELY BIASED TRANSISTOR FOR SECOND BREAKDOWN
Peter Schiff, White House Station, N.J., assignor to Radio Corporation of America, a corporation of Delaware
Filed Dec. 28, 1964, Ser. No. 421,440
17 Claims. (Cl. 324—158)

ABSTRACT OF THE DISCLOSURE

A test device is described for non-destructively testing a transistor for reverse biased second breakdown. The test device applies an increasing voltage across the collector and emitter of a reversely biased transistor until second breakdown occurs, at which time radio frequency noise appears at the control electrode of the transistor. Responsive to this radio frequency noise, the voltage is removed by short-circuiting the collector and emitter of the transistor quickly enough to prevent damage to the transistor.

---

This invention relates to transistor test apparatus and more particularly to apparatus for non-destructively measuring the energy required to produce reverse biased second breakdown of a transistor.

When a transistor is used in a highly inductive circuit in which it is suddenly reverse biased to switch it to an off or nonconductive condition, a high voltage is developed across the transistor in a direction tending to continue the flow of current. This voltage and the accompanying decaying current may be high enough to destroy or damage the transistor. Therefore, it is important to know the energy that the transistor can withstand, for a known reverse biased condition, without damage thereto. Since this amount of energy is not uniform from transistor to transistor, even though they be of the same type, it is necessary individually to test each transistor to be used in such a circuit. One method of so testing transistors is to apply an increasing voltage across its collector and emitter when a reverse bias is applied between its base and emitter, and to observe the point at which the voltage across the transistor collapses, this point being called second breakdown. However, within a few microseconds after the voltage collapse, many transistors are destroyed or so damaged that their performance as an amplifying device is degraded by the highly localized current that flows through the transistor after second breakdown, unless the voltage across the transistor is removed before such damage. Removal of the test voltage by disconnecting the test voltage from across the transistor may be too slow to save the transistor from damage. Also such a test would not simulate the conditions of an inductive stress, which would be apppplied to the transistor in many actual applications. Furthermore, the operator of the test instrument has a difficult task of observing an instrument, such as a cathode ray tube, and nothing the peak reading thereof at the instant before the peak reading disappears without warning.

It is an object of this invention to provide an improved test instrument for measuring the reverse biased second breakdown energy of a transistor without destroying or degrading it.

It is another object of this invention to provide such a test instrument that removes the test voltage from a transistor under test sufficiently quickly to prevent damage thereto.

It is a further object of this invention to provide such a test instrument that gives a continued indication of the maximum test energy applied to the transistor after the test is completed.

An added object of this invention is to provide apparatus for testing a transistor simulating the actual circuit conditions of inductance, current, and reverse bias of a circuit in which the transistor may be used.

In accordance with this invention, a variable current is applied through an inductor, which may be variable, into the collector of a transistor under test as the transistor is periodically pulsed into saturation by current pulses applied to its base circuit. At the end of and between these saturating pulses applied to the base, the base is reverse biased, whereby a high voltage is induced across the transistor at the ends of the pulses, that is, each time the transistor is cut off. The variable current is increased or the inductance of the inductor is increased, or both are increased until for predetermined reverse bias in the base, second breakdown occurs, at which time a few cycles of oscillations of a noise in the radio frequency band occurs between the base and the emitter of the transistor under test. In response to this noise, the collector to emitter path of the transistor is short circuited to remove the test voltage applied across the transistor by the inductor, and a light goes on to indicate to the operator that the scales of the variable current source and of the inductor should be read. The scales can be calibrated to give the energy applied to the transistor at second breakdown. Means can be provided to prevent noise that may occur in the transistor circuit, at the rise and fall of the saturating pulses, from causing triggering of the second breakdown detector and thereby providing a false reading. Further means for protecting the transistor such as means to turn on the variable current source only during the saturation of the transistor under test, and such as means to prevent appplication of saturating pulses to the transistor after second breakdown can be provided.

The novel features of this invention both as to its organization and method of operation, as well as additional objects and advantages thereof will be understood more readily from the following description, when read in conjunction with the accompanying drawing in which:

FIG. 3 is a more detailed circuit diagram of the test instrument of FIG. 2.

Figure 1:
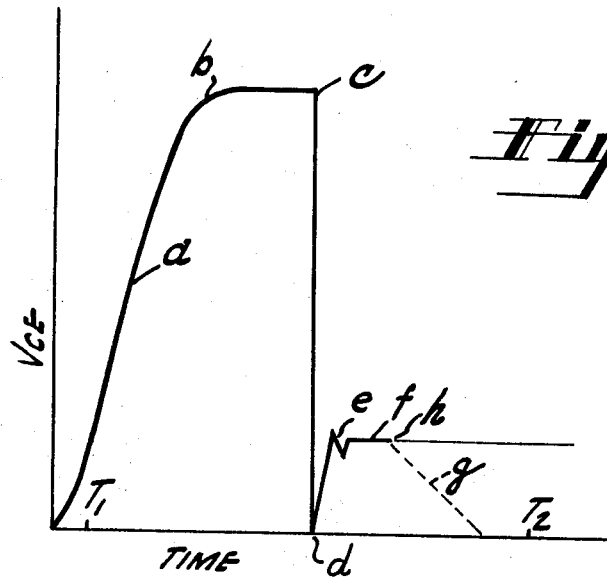
FIG. 1 is a curve used in explaining this invention.

As uniform current is applied to a reversely biased transistor, the voltage thereacross goes up more or less linearly with time, as indicated by the portion $a$ of the curve of FIG. 1, until at point $b$ the voltage across the transistor ceases to increase, or may even decrease, even though higher currents are applied thereto. The point $b$ is called first breakdown of the transistor. If the application of such high currents are continued, or if this current is increased, a point $c$ is reached at which the voltage across the transistor collapses substantially to zero, as indicated by the point $d$. The point $c$ is called the reverse biased second breakdown point. The voltage across the transistor then rises, and a few cycles of oscillations of radio frequency noise appear across the base to emitter electrodes of the transistor as indicated by the part of the curve labelled $e$. Then the voltage across the transistor levels off to a steady value indicated by $f$. A fraction of a microsecond after the oscillations are produced at $e$, a point $h$ is reached at which many transistors are destroyed, as indicated by the dotted curve $g$, by the highly localized currents flowing therethrough. The voltage across other transistors which are not yet destroyed, but which may be degraded, follow along the level curve $h$ until the voltage is removed therefrom or until the transistor is finally destroyed. As stated above, a radio frequency noise occurs between the base and the emitter of the reverse biased transistor at the initiation of reverse biased second breakdown thereof and a fraction of a microsecond before the transistor is damaged. A circuit detecting the second breakdown radio frequency noise oscillations and for removing the voltage from across the transistor in response to these radio frequency noise oscillations in time to prevent damage thereto is shown in FIGS. 2 and 3.

Figure 2:
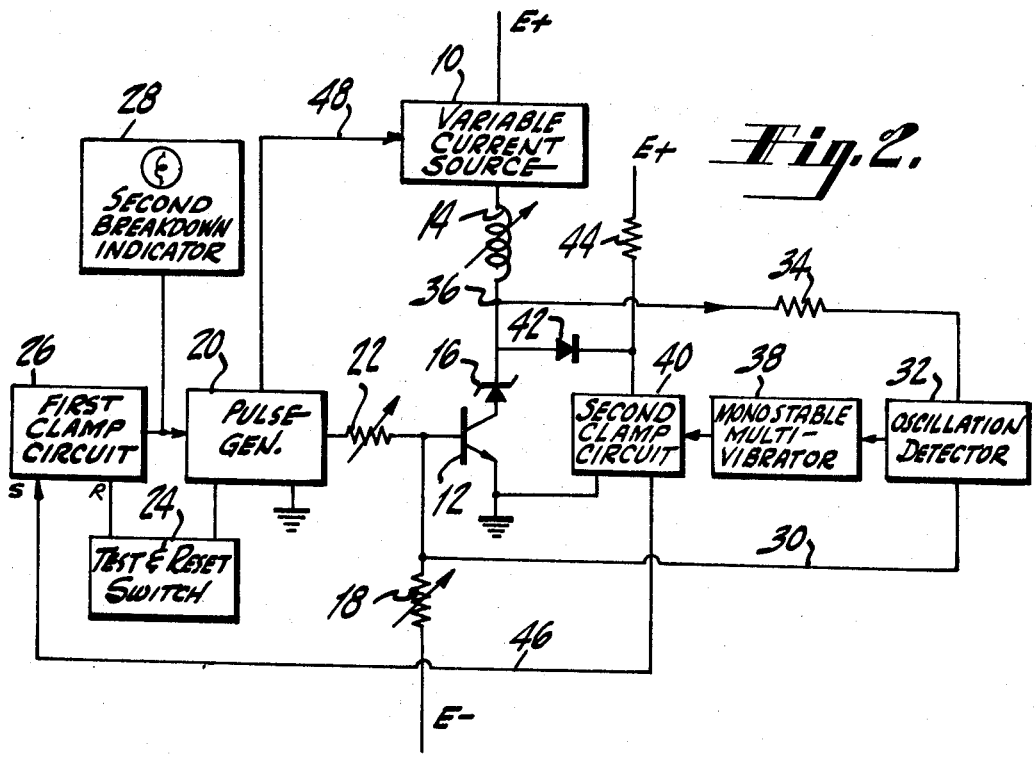
FIG. 2 is a block diagram of one embodiment of the circuit of a test instrument embodying this instrument.

Turning first to FIG. 2, a variable current source 10 is connected to the collector of a transistor 12 to be tested through a variable inductor 14 and a Zener diode 16 in tandem, the emitter of the transistor 12 being connected to system ground. Reverse bias can be applied to the base of the transistor 12 through an adjustable resistor 18 from a source of voltage E— which can also be variable. A pulse generator 20 is connected through a variable resistor 22 to the base of the transistor 12 to apply pulses in the forward direction, at a duty cycle of about 5%, to the base of the transistor 12. These pulses are adjustable in amplitude by manipulation of the resistor 22 and are sufficient in amplitude to overcome the reverse voltage applied to the base of the transistor through the resistor 18 and thereby to drive the transistor 12 into saturation. These pulses have steep back or trailing edges to permit the transistor 12 to turn off abruptly, at which time the collector voltage increases suddenly since the inductor 14 tends to keep constant the current flowing therethrough.

The output of a first clamp circuit 26, which may comprise a bistable multivibrator having a set and a reset condition of conduction, is applied both to the pulse generator 20 and to a second breakdown indicator 28. This clamp circuit 26 is designed to activate the pulse generator 20 when the clamp circuit 26 is in its reset condition, therefore to cause the pulse generator 20 to supply pulses to the transistor under test 12 to saturate it. The clamp circuit 26, when in its set condition, applies a voltage to the pulse generator 20 to prevent it from oscillating, and to the second breakdown indicator 28, which may be a light source, to activate the indicator 28 thereby to signal the operator to read the scales (not shown) of the variable current source 10 and of the inductor 14. A test and reset switch 24 is connected to reset the first clamp circuit 26 when the switch 24 is moved to its test position, as will be more fully explained.

As noted above, radio frequency noise oscillations appear at the base of the transistor 12 under test to indicate occurrence of reverse biased second breakdown. These oscillations are applied by way of a conductor 30 to an oscillation detector 32. Since noise may occur in the base of the transistor 12 when the transistor is switched on and off by the pulse generator 20, the oscillation detector 32 is normally disabled so that it cannot respond to the radio frequency noise arriving over the connection 30 until the transistor 12 under test has a high collector to emitter voltage, whereby an incorrect indication of reverse bias second breakdown is prevented. The oscillation detector 32 is activated or enabled by a high voltage appearing at the collector of the transistor 12, as will be explained below.

When the transistor under test 12 is saturated by pulses from the test generator 20, the impedance of the transistor is low and therefore the voltage at the point 36, which is at the junction of the Zener diode 16 and of the inductor 14, remains low. The voltage at the point 36 rises due to the inductive kickback of the inductor 14 when the transistor under test 12 is reverse biased. This voltage is applied to the oscillation detector 32 through the current limiting resistor 34 to activate or enable the oscillation detector 32 as of a time, such as the time $T_1$ of FIG. 1, which is just after the transistor is rendered nonconductive by the reverse bias applied thereto from the source E—. Due to a delay built into the oscillation detector 32, as will be explained, the oscillation detector 32 remains enabled at least until after the occurrence of the second breakdown, that is, to a time such as $T_2$ of FIG. 1, even though the voltage at the point 36 may drop substantially to zero during the test of the transistor 12. Occurrence of noise at the base of the transistor 12 during a high voltage condition at junction 36 causes the oscillation detector 32 to apply a pulse to the monostable multivibrator 38 to which it is connected, causing the multivibrator 38 to apply a pulse to a second clamp circuit 40. The second clamp circuit 40 is connected from the junction 36 to ground, a diode 42, which is reverse biased from a source $E^+$ through a resistor 44, being connected between the point 36 and the second clamp circuit 40 to decouple the inductor 14 from any capacity inherently present in the second clamp circuit 40, which would otherwise act as the capacity of a resonant circuit with the inductor 14. Thereby energy appearing at the junction 36, upon discharge of the inductor 14 is all applied to the transistor 12, and none of this energy appearing at the junction 36 is shunted around the transistor 12 by this inherent capacity.

The second clamp circuit 40 may comprise a short circuiting device for the purpose of short circuiting the collector of the transistor under test 12 to its emitter after reverse biased second breakdown and before the transistor 12 is destroyed or degraded. However, the diode 42 in its forward direction and the second clamp circuit 40 even in short circuited condition, each has some resistance. Therefore, operation of the second clamp circuit alone in its fully conductive state cannot apply a short circuit to the transistor 12. Therefore, the Zener diode 16 is provided to overcome the resistance of the diode 42 in its forward direction and of the second clamp circuit 40 when conductive. That is, when as here, the series resistance of the Zener diode 16 and of the transistor under test 12 at second breakdown is greater than the forward resistance of the diode 42 and of the second clamp circuit 40 when conductive, then voltage is removed from across the transistor 12 when the clamps circuit 40 is rendered conductive.

When the second clamp circuit 40 is rendered conductive, a pulse is sent to the first clamp circuit 26 through a connection 46 to set the first clamp circuit 26, at which time the first clamp circuit 26 applies energy to the second breakdown indicator 28 to energize it, and also a voltage is applied to the pulse generator 20 from the first clamp circuit 26 to prevent the generator 20 from applying further positive pulses to the base of the transistor 12. At the same time, voltage is applied to the variable current source 10 by way of a conductor 48 to turn off the current source 10.

In testing the transistor 12 for reverse biased second breakdown, the operator moves the test and reset switch 24 to its test position, which resets the first clamp circuit 26, should it be set. The operator holds the switch there until the test is over. Meanwhile, the operator manually increases the current flow through the variable current source 10, or he increases the inductance value of the inductor 14, or both, until the indicator provides an indication, at which time the operator releases the switch 24 to permit it to move to its original position. The operator then reads the scales (not shown) at the variable current source 10 and at the inductor 14. These readings are a measure of the energy applied to the transistor 12 for reverse biased second breakdown thereof for the reverse bias applied to the base circuit of transistor 12 at the time of the test. The scales may be read at leisure since they remain unchanged until they are returned to a minimum value for the next test, and the transistor is saved from damage by the short circuit applied thereacross in response to the radio frequency noise occurring in the base to the emitter circuit thereof at the initiation of reverse biased second breakdown. Furthermore, since the oscillation detector 32 is sensitized or enabled only during reverse bias across the transistor 12, false indications by noises in its base to emitter circuit occurring during forward bias thereof is prevented. Also, the pulse generator 20 is prevented from applying pulses to the transistor 12, and the variable current source 10 is blocked, after reverse biased second breakdown occurs, to prevent further test voltages from being applied to the transistor 12.

In order to prevent high direct current dissipation from occurring either in the test apparatus or in the transistor under test when a defective or shorted transistor 12 is being tested, the variable current source 10 is turned on only when the transistor 12 is saturated. This is accomplished by feeding a signal through the conductor 48 from the pulse generator 20 to the variable current source 10 whenever the transistor under test 12 is forward biased.

Since the duty cycle of the pulse generator 20 is maintained at 5%, heating is minimal even while testing a shorted transistor 12.

A more complete circuit diagram of the test instrument is shown by way of example in FIG. 3. Many of the apparatus illustrated in FIG. 2 as rectangles are shown in more detail in FIG. 3 and are described more fully in connection therewith.

The variable current source 10 comprises a transistor Q19 whose collector is connected to the voltage supply E+ and whose emitter is connected through a resistor 50 to a terminal 89 of the inductor 14. All transistors, unless otherwise indicated, are of the NPN type. Another resistor 52 can be connected in parallel with the resistor 50 by a switch 54. The base of the transistor Q19 is connected through a capacitor 56, a resistor 58 in parallel therewith, and the series combination of a resistor 60, a diode 62 and a further resistor 64 connected in parallel with the resistor 58, to the voltage supply E+. The base of the transistor Q19 is also connected to the collector of a transistor Q20 through a resistor 66, the emitter of the transistor Q20 being connected to system ground. The base of the transistor Q20 is connected through a resistor 68 to system ground and through a resistor 70 and a Zener diode 72 to the terminal 89 of the inductor 14. A second Zener diode 74 is connected across the series combination of the Zener diode 72 and the resistors 68 and 70. The collector of an additional transistor Q18 is connected to the current supply E+ through the resistor 58. The base of the transistor Q18 is connected through a resistor 76 to the emitter of the transistor Q19, and the emitter of the transistor Q18 is connected to the terminal 89 of the inductor 14 through a resistor 78. The collector of a further transistor Q17 is directly connected to the supply E+ and the emitter of transistor Q17 is connected through the resistor 78 to the terminal 89 of the inductor 14. A resistor 80 and a potentiometer 82 are connected in series from the supply E+ to the terminal 89 of the inductor 14, a Zener diode 84 being connected across the potentiometer 82. The base of the transistor Q17 is connected to the sliding connection or slider of the potentiometer 82. The emitter of a transistor Q16 is connected to system ground and its collector is connected to the supply E+ through the resistor 64 and to the terminal 89 of the inductor 14 through a diode 86. The base of the transistor 16 is connected to the supply E+ through a resistor 88, and the base of the transistor Q16 is also connected by connector 48 to the pulse generator 20 for a purpose to be explained.

The variable current source 10 operates to keep constant the current flowing into the inductor 14, this constant current being determined by the position of the sliding arm on the potentiometer 82. The voltage drop across the potentiometer 82 is kept constant by the Zener diode 84. The current through the transistor Q17 is determined by the voltage applied to the base thereof by the slider of the potentiometer 82. When the switch 54 is open, current flows into the inductor 14 through the collector to emitter path of the transistor Q19 and the resistor 50 in tandem. The voltage drop resulting from this current flow in the resistor 50 is applied between the base and the emitter of the transistor Q18 in opposition to the voltage drop developed across the resistor 78. If the voltage drop across the resistor 50 is higher than that across the resistor 78, the transistor Q18 is made conductive to cut down on the conductivity of the transistor Q19 thereby to cut down on the current flow into the inductor 14. If the voltage drop due to the current flowing in the resistor 50 is less than the voltage drop across the resistor 78, the transistor Q18 is made less conductive and the transistor Q19 is made more conductive to increase the current flow into the inductor 14. Therefore, at each position of the slider on the potentiometer 82 a predetermined current will flow into the inductor 14. By closing the switch 54, the resistor 52 is connected in parallel with the resistor 50 and the current flow into the inductor 14 at the various settings of the slider on the potentiometer 82 is multiplied by a factor dependent upon the values of the resistors 50 and 52. The transistor Q20 and its base elements 68, 70, and 72 prevent the voltage of the terminal point 89 from going too high. When the voltage at this connection point 89 gets to a desired maximum value (such as 20 volts) the transistor Q20 is saturated to apply a blocking bias to the base of the transistor Q19 through the decoupling resistor 66 to stop current flow through the transistor Q19 and so reduce the voltage at the point 89. The Zener diode 74 operates quickly to clamp the point 89 to ground for any ringing voltages greater than the desired maximum that may appear at this point 89 due to the operation of the inductor 14. Elements 68, 70, and 72 operate more slowly to protect the Zener diode 74 from currents of greater duration that may appear at point 89. As for the transistor Q16, upon application of a positive voltage on its base from the pulse generator 20 by way of the conductor 48, the transistor Q16 applies a short circuit to ground to the base of the transistor Q19 through the elements 60 and 62 in tandem to turn off the transistor Q19 and prevent current flow into the inductor 14. The purpose of this last mentioned operation is explained hereinafter.

The oscillation detector 32 comprises two transistors Q15 and Q14, the emitter of the transistor Q15 being connected to the collector of the transistor Q14, the collector of the transistor Q15 being connected to a positive bus line 90 and the emitter of the transistor Q14 being connected to ground through the parallel connection of a resistor 92 and a capacitor 94. Filter capacitors 96 may be connected between the line 90 and ground. The base of the transistor Q15 is connected to ground through a resistor 98 and to the junction point 36 through a Zener diode 100, a diode 102 and the resistor 34 all connected in series. The base of the transistor Q14 is connected through an inductor 106 to the junction of two resistors 108 and 110 which are connected in series between the line 90 and ground. The base of the transistor Q14 is also connected through a capacitor 112 and the line 30 to the base of the transistor under test 12. A capacitor 114 is connected between the emitter of the transistor Q14 and the junction of the resistors 108 and 110.

Current is supplied through the current limiting resistor 34, the direction determining diode 102 and the Zener diode 100 to the base of the transistor Q15 in proper polarity and amount to make the transistor Q15 conductive when the voltage at the point 36 rises, during the induced voltage at the collector of the transistor 12, to a predetermined value, such as that corresponding to time $T_1$ in FIG. 1. Due to the time constant of the resistor 98 and the inherent capacity of the transistor Q15, the transistor Q15 is kept conductive for a period of time after the voltage across the transistor 12 has fallen to the low voltage $d$ (of FIG. 1) after second breakdown $c$, causing the oscillation detector 32 to remain enabled long enough to permit removal of the voltage from across the transistor 12. This time period may extend from the time $T_1$ to the time $T_2$ of FIG. 1. Therefore, the transistor Q15 is made conductive only when a high voltage appears at the collector of the transistor 12 whereby the oscillation detector 32 is activated or enabled only when a test voltage is applied to the transistor 12 and whereby noise occurring at the base of the transistor 12 at other times cannot cause operation of the oscillation detector 32 to cause an incorrect indication by the hereindescribed instrument.

When noise oscillations, which have a time duration of about 1/10 of a microsecond, appear at the base of the transistor 12, the A.C. component of the noise is applied to the base of the transistor Q14 by the line 30 and through the capacitor 112. If the transistor Q15 is conductive, the positive portions of the noise oscillations appear in amplified form in the emitter of the transistor Q14. The voltage at the emitter of the transistor Q14 is filtered by the capacitor 94 and fed back into the base of the transistor Q14 by the capacitor 114 and the inductor 106. Any subsequent noise oscillations are therefore added to the voltage already existing across the resistor 92. When a voltage appears across the resistor 92, a pulse is applied from the emitter of the transistor Q14 to the monostable multivibrator 38 through a diode 116 to cause the monostable multivibrator 38 to further integrate the noise oscillations applied thereto. The diode 116 acts to prevent the multivibrator 38 from reverting to its stable state during the fluctuations of this noise.

The monostable multivibrator 38 comprises two transistors Q13 and Q12 which are so cross-coupled that the transistor Q12 is normally nonconductive and the transistor Q13 is normally conductive. Application of a positive pulse to the base of the transistor Q12 causes it to become conductive and causes the multivibrator 38 to go through one cycle of operation, that is, the transistor Q12 becomes conductive and remains conductive and the transistor Q13 remains nonconductive for a period of time dependent upon size of the capacitor 118 connected to the collector of the transistor Q13, and then the transistor Q12 becomes and remains nonconductive, the transistor Q13 becoming conductive, until another pulse is applied to the base of the transistor Q12. A diode 120, connected between the base and the collector of the transistor Q13, is provided to prevent the transistor Q13 from going into saturation thereby permitting the multivibrator 38 to respond more quickly to the noise pulse applied thereto from the oscillation detector 32. A pulse is applied to the second clamp circuit 40 from the collector of the transistor Q12 of the monostable multivibrator 38.

The second clamp circuit 40 acts to apply a short circuit through the diode 42 from the point 36 to system ground. A transistor Q11, comprising part of the second clamp circuit 40, is connected to act as an amplifier and phase inverter of the pulse applied thereto from the multivibrator 38. A transistor Q10 to which the output of the transistor Q11 is applied, acts as a current amplifier of the pulse applied thereto from the transistor Q11. The collector of a transistor Q8 is connected through a single pole double throw switch 122 and through the diode 42 to the point 36. The emitter of the transistor Q8 is connected to system ground and the base thereof is connected through a second single pole double throw switch 124, which is ganged with the switch 122, to the emitter of the transistor Q10. Therefore, when a pulse is applied to the second clamp circuit 40 from the monostable multivibrator 38 and the ganged switches 122 and 124 are in the position shown in FIG. 3, the transistor Q8 is saturated to render it fully conductive and to put a substantial short circuit across the point 36 and ground to remove the high test voltage from the transistor 12. Since the voltage applied across the transistor 12 may be removed quicker by providing a short circuit than by opening the circuit of the applied test voltage, the described circuit effectively removes the test voltage from the transistor 12 after reverse baised second breakdown and before the transistor 12 is damaged. A Zener diode 121, connected between the collector of the transistor Q8 and its emitter, protects the transistor Q8 from voltages greater than its own breakdown voltages, if such appear across the transistor under test 12.

If the transistor 12 is a particularly high voltage type of transistor, the test voltage therefor appearing at the point 36 may be built up to higher than the breakdown voltage of the short circuiting transistor Q8. Therefore, a high voltage silicon controlled rectifier Q7 is provided to short circuit such a high voltage transistor under test 12. The cathode of the silicon controlled rectifier Q7 is connected to ground, its anode is connected through the switch 122 in the other position thereof and through the diode 42 in series to the point 36, and its control electrode is connected through a differentiating circuit 126 and through the switch 124 in the other position thereof to the emitter of the transistor Q10. Therefore, at the other position of switch 122 and 124, the silicon controlled rectifier Q7 is made conductive to provide the required short circuit across a high voltage transistor 12. While the silicon controlled rectifier Q7 requires a longer time to become conductive after a voltage is applied to its control electrode than the transistor Q8, high voltage types of transistors under test 12 are not damaged as quickly after reverse biased second breakdown as lower voltage types of transistors, whereby a silicon controlled rectifier Q7 removes the voltage from a high voltage transistor under test 12 in sufficient time to prevent damage thereto.

The silicon controlled rectifier Q7 furthermore has the property of remaining conductive once it is rendered conductive until the voltage between its anode and cathode is removed. To insure that the silicon controlled rectifier Q7 is rendered nonconductive in time to be ready for the next test, a relay 128 is provided whose terminals are connected across the anode and cathode of the silicon controlled rectifier Q7 and whose energizing coil is connected between the power line or bus 90 and the collector of the transistor Q9. Due to the slow operate and slow release features of the relay 128, the silicon controlled rectifier Q7 may be made conductive by the transistor Q10 and remain conductive during a period of time sufficient for the protection of the transistor under test 12 and yet the silicon controlled rectifier Q7 may be rendered nonconductive to prepare it for the next test by the closing of the relay 128 and so short circuiting its anode and cathode after second breakdown of the transistor under test 12.

The first clamp circuit 26 can be a conventional bistable multivibrator and therefore it is shown merely as a labelled rectangle. The first clamp circuit 26 produces a positive potential output when in its set position and a negative potential when in its reset position. When a pulse appears at the collector of the transistor Q11 of the second clamp circuit 40, it is applied by the conductor 46 to the set input of the bistable multivibrator to cause it to provide a positive voltage at the base of the transistor Q1. Transistor Q1 becomes conductive and the indicator 28 which is connected between the collector of the transistor Q1 and the bus line 90 and which may be a light, goes on to indicate that a short circuit has been applied to the transistor under test 12 and that the test is completed and that the scale on the potentiometer 82 of the variable current source 10 or the scale on the inductor 14, or both, should be read. If it is desired, the light 28 may illuminate these scales. The voltage appearing at the base of the transistor Q1 is applied to the pulse generator 20 by way of the line 129. When this voltage is high or positive, it prevents the pulse generator 20 from applying a pulse to the base of the transistor 12, as will be explained.

To prepare the test instrument of FIG. 3 for a test, the test switch 24 is moved from the position shown therein to the left to connect the reset input of the bistable multivibrator included in the first clamp circuit 26 to ground. This connection causes the bistable multivibrator to provide a low or negative voltage at the base of the transistor Q1 whereby it is rendered nonconductive and the light 28 is off. This low voltage is also applied to the pulse generator 20 to permit it to pass pulses from an astable multivibrator to the base of the transistor under test 12, as will be explained.

The pulse generator 20 comprises a conventional astable multivibrator 130, that is, a multivibrator that will oscillate at a predetermined frequency, preferably of about ten pulses per second, and preferably having a duty cycle of about 5%. That is, for about 5% of the time, the astable multivibrator 130 produces negative pulses at its output and for 95% of the time the astable multivibrator produces zero or positive output pulses. The astable multivibrator 130 is prevented from oscillating when the test switch 24 is in the position shown in FIG. 3 when an element of this astable multivibrator 130 is connected to ground, and the astable multivibrator 130 is permitted to oscillate when the switch 24 is moved to the left to remove the connection to ground from the astable multivibrator 130. The output of the astable multivibrator 130 is applied to the base of a transistor Q4. The transistor Q4 and a transistor Q5 are connected as a Schmitt trigger circuit and apply a sharp pulse to a PNP transistor Q6 to make it nonconductive abruptly. Due to the duty cycle of the astable multivibrator 130, transistor Q5 is off for 95% of the time during a test. Normally the transistor Q6 is kept nonconductive by the reverse bias applied to its emitter through a Zener diode 132 but the transistor Q6 is rendered conductive when the transistor Q5 is conductive. When the transistor Q6 is conductive, current flows into the base of the transistor 12 from the positive bus line 90 through the collector to emitter path of the transistor Q6 and through the resistor 22, overcoming the reverse bias applied to the base of the transistor under test 12 from the source E— and thereby saturating the transistor 12. That is, transistors Q5, Q6, and 12 are all off or all on at the same time. The transistor 12 is abruptly blocked by the voltage applied to its base from the source E— when the transistor Q6 is made nonconductive to cause a high test voltage to be developed across the inductor 14 and to be applied between the collector and emitter of the transistor 12.

Whenever the first clamp circuit 26 is in its set condition, a positive voltage is applied through the connection 129 to the base of a transistor Q3, which is a part of the pulse generator 20, rendering the transistor Q3 conductive. The emitter of the transistor Q3 is connected to ground and its collector is connected to the collector of the transistor Q4 whereby when the transistor Q3 is conductive it removes the voltage from between the collector and emitter of the transistor Q4 and the transistor Q4 cannot respond to the pulses applied thereto. Therefore, when the first clamp circuit 26 is in its set condition, the astable multivibrator 130 continues to oscillate when the test and reset switch 24 is in its test position but the Schmitt trigger circuit comprising the transistor Q4 and Q5 is disabled and transistors Q5 and Q6 are nonconductive and the transistor 12 is in reverse biased or off condition.

The collector of the transistor Q3 is also connected to the base of a transistor Q2 through a diode and a resistor in series, the emitter of this transistor Q2 being connected to ground and its collector being connected to the base of the transistor Q16 through the line 48 and to the source E+ through the load resistor 88. Therefore when the transistor Q3 is rendered conductive, the transistor Q2 is rendered nonconductive and the transistor Q16 is saturated, short circuiting the base of the transistor Q19 to ground through the resistor 60 and the diode 62 and the collector to emitter path of the transistor Q16, whereby the variable current source 10 is disabled and current flow to the inductor 14 and therefore to the transistor under test 12 is turned off.

The operation of the circuits of FIGS. 1 and 3 is the same. However, the following more detailed explanation may be helpful in connection with FIG. 3:

To test a transistor such as transistor 12 for reverse biased second breakdown, reverse bias is applied thereto from source E— through the resistor 18. Then the test switch 24 is moved from its right hand position as viewed in FIG. 3 to its left hand position at which time the first clamp circuit 26 is reset, that is, it applies a negative bias to the transistor Q1 whereby the indicator 28 is off and the first clamp circuit 26 applies a negative bias to the transistor Q3 whereby this transistor is turned off. Movement of the switch 24 to the left also removes a disabling potential from the astable multivibrator 130, whereby short positive pulses having steeply declining or trailing edges are applied to the base of the transistor 12 by way of the transistors Q4, Q5, and Q6. When the transistor 12 is conductive and the variable current source 10 is turned on by the pulse generator 20, current in the transistor gradually builds up to a limit determined by the setting of potentiometer 82 and switch 54. As the saturating pulse applied to the base of transistor 12 from the pulse generator 20 drops sharply, the base of the transistor 12 is subjected to the reverse bias determined by the —E supply and resistor 18. Since the collector circuit of transistor 12 now represents a high impedance and the current in the inductor cannot decrease instantaneously, the collector voltage of transistor 12 increases rapidly. The inductor 14 tends to maintain a constant current therethrough which decays over a period of time of time depending on the energy in the inductor 14 and the breakdown voltage of transistor 12. The value of this energy will be known if the values of the current and of the inductor are known. If the energy applied to the transistor 12 is not great enough to cause reverse biased second breakdown, the voltage applied to the transistor 12 will go from substantially zero up along the curve of FIG. 1 but will cease before the voltage applied to the transistor 12 arrives at the point c. The energy applied to the transistor 12 may be increased until reverse biased second breakdown occurs by manipulation of the slider of the potentiometer 82, or by increasing the value of the inductor 14, or both. The oscillation detector is enabled by the voltage induced across the inductor at the point 36 after the voltage applied to the transistor 12 has started to increase as at the time $T_1$ of FIG. 1.

The switch 24 is held in its left position and the voltage applied to the transistor 12 is increased until a radio frequency noise which indicates the occurrence of reverse biased second breakdown appears at the base of the transistor 12. The radio frequency noise is applied to the oscillation detector 32 by the connection 30 causing the transistor Q8 to apply a short circuit across the transistor 12 to remove the high test voltage therefrom. At the same time, a voltage is applied by the connector 46 to set the first clamp circuit 26 to cause it to apply a positive voltage to the base of the transistor Q1 which energizes the indicator 28, whereupon the operator reads the position of the slider on the potentiometer 82 and the scale of the inductor 14 (not shown). Positive voltage is applied to the transistor Q3 to prevent further positive pulses from being applied to the base of the transistor 12 and the transistor 19 is turned off to prevent further current from flowing to the transistor 12, thereby protecting the transistor 12 from the application of further high test voltages.

By closing switch 54, higher test currents and therefore higher test energies may be applied to the transistor under test 12. If the breakdown voltage of transistor 12 is greater than that of transistor Q8, then by manipulation of the ganged switches 122 and 124, the silicon controlled rectifier Q7 may be substituted as the short circuit element for the transistor Q8. The diode 134 is connected between the point 36 and ground to short circuit negative going voltage that may be applied to the transistor under test 12 due to possible ringing or resonant oscillations of the inductor 14.

Only the common emitter configuration of the transistor under test has been described above. However, since the noise in the radio frequency range occurs on the control electrode at reverse biased second breakdown using any configuration of the transistor under test, the above described apparatus may be used to apply such a test to a transistor in any configuration thereof.

It will undoubtedly be apparent to those skilled in the art that variations of the described reverse biased second breakdown test instrument are possible within the spirit of this invention. For example, by reversing the type of transistors used and by reversing the polarities of the several voltage sources, negative test voltages may be applied to a PNP transistor 12 to be tested instead of to the NPN transistor shown. Hence it should be understood that the foregoing description is to be considered as illustrative and not in a limiting sense.

What is claimed is:

1. Apparatus for testing a transistor having a control electrode and a pair of main electrodes for reverse biased second breakdown comprising:
 means to apply reverse bias between said control electrode and one of said main electrodes;
 means for applying an increasing test voltage between said main electrodes whereby upon occurrence of reverse biased second breakdown a noise appears at said control electrode; and
 means responsive to the occurrence of said noise at the control electrode of said transistor for removing said test voltage from said main electrodes.

2. Apparatus for testing a transistor having a control electrode and a pair of main electrodes for reverse biased second breakdown comprising:
 means to apply reverse bias between said control electrode and one of said main electrodes;
 means for applying increasing test voltage between said main electrodes whereby upon occurrence of reverse biased second breakdown a noise appears at said control electrode; and
 means responsive to the occurrence of said noise at the control electrode of said transistor for short circuiting said main electrodes, whereby the test voltage is removed from said main electrodes.

3. Apparatus for testing a transistor having a control electrode and a pair of main electrodes for reverse biased second breakdown comprising:
 an inductor;
 a current source;
 at least one of said inductor and said current source being adjustable;
 means for supplying current from said current source between said main electrodes through said inductor;
 means for applying a reverse bias between said control electrode and one of said main electrodes to cut off said transistor whereby a test voltage is induced in said inductor and is applied across the main electrodes of said transistor, a noise voltage appearing between said control electrode and one of said main electrodes upon occurrence of reverse biased second breakdown of said transistor; and
 means responsive to the occurrence of said noise voltage at the control electrode of said transistor to remove the test voltage from the said main electrodes.

4. Apparatus for testing a transistor having a control electrode and a pair of main electrodes for reverse biased second breakdown comprising:
 an inductor;
 a current source;
 at least one of said inductors and said current source being adjustable;
 means for supplying current from said current source between said main electrodes through said inductor;
 means for applying a reverse bias between said control electrode and one of said main electrodes to cut off said transistor whereby a test voltage is induced in said inductor and is applied across the main electrodes of said transistor, a noise voltage appearing between said control electrode and one of said main electrodes upon occurrence of reverse biased second breakdown of said transistor; and
 means responsive to the occurrence of said noise voltage at the control electrode of said transistor to short circuit said main electrodes thereby to remove the test voltage from said main electrodes.

5. Apparatus for testing a transistor having a control electrode and a pair of main electrodes for reverse biased second breakdown comprising:
 an inductor;
 a current source;
 at least one of said inductor and said current source being variable;
 means for supplying current from said current source through said inductor to the main electrodes of said transistor;
 means for applying a reverse bias between said control electrode and one of said main electrodes;
 means for applying pulses in opposition to said reverse bias between said control electrode and said one main electrode to render said transistors conductive during said pulses whereby current flows from said current source through said inductor and transistor during said pulses and whereby said current flow is blocked between said pulses to apply an induced test voltage to said main electrodes as a result of cutting off said transistor, a radio frequency noise appearing between said control electrode and one of said main electrodes upon occurrence of reverse biased second breakdown of said transistor; and
 means responsive to said radio frequency noise occurring at said control electrode for short circuiting said main electrodes.

6. Apparatus for testing a transistor having a control electrode and a pair of main electrodes for reverse bias second breakdown comprising:
 an inductor;
 means for connecting a current source and said inductor across the main electrodes of said transistor;
 at least one of said inductor and said current source being variable;
 means for applying a reverse bias between said control electrode and one of said main electrodes;
 means for applying pulses in opposition to said reverse bias between said control electrode and one main electrode to render said transistor conductive during said pulses, whereby current flows from said current source through said inductor and the main electrodes of said transistor during said pulses and whereby a test voltage is induced and applied across said main electrodes at the ends of said pulses, a radio frequency noise appearing between said control electrode and one of said main electrodes upon occurrence of reverse biased second breakdown of said transistor;
 means responsive to said radio frequency noise appearing at the control electrode of said transistor for disabling said source of pulses, for disabling said current source, and for short circuiting the main electrodes of said transistor.

7. Apparatus for testing a transistor having a control electrode and a pair of main electrodes for reverse biased second breakdown comprising:
 an inductor;
 means for connecting a current source and said inductor across the main electrodes of said transistor;
 at least one of said inductor and said current source being variable;

means for applying a reverse bias between said control electrode and one of said main electrodes;
means for applying pulses in opposition to said reverse bias between said control electrodes and one main electrode to render said transistor conductive during said pulses whereby current flows from said current source through said inductor and the main electrodes of said transistor during said pulses and whereby a test voltage is induced and applied across said main electrodes at the ends of said pulses, a radio frequency noise appearing between said control electrode and one of said main electrodes upon occurrence of reverse biased second breakdown of said transistor;
means responsive to said radio frequency noise appearing at the control electrode of said transistor for disabling said current source, and for short circuiting the main electrode of said transistor.

8. Apparatus for testing a transistor having a control electrode and a pair of main electrodes for reverse biased second breakdown comprising:
an inductor;
means for connecting a current source and said inductor across the main electrodes of said transistor;
at least one of said inductor and said current source being variable;
means for applying a reverse bias between said control electrode and one of said main electrodes;
means for applying pulses in opposition to said reverse bias between said control electrode and one main electrode to render said transistor conductive during said pulses, whereby current flows from said current source through said inductor and the main electrodes of said transistor during said pulses and whereby a test voltage is induced and applied across said main electrodes at the ends of said pulses, a radio frequency noise appearing between said control electrode and one of said main electrodes upon occurrence of reverse biased second breakdown of said transistor;
means responsive to said radio frequency noise appearing at the control electrode of said transistor for disabling said source of pulses and means responsive to said noise appearing at said control electrode for disabling said current source; and
means responsive to said radio frequency noise appearing at said control electrode for short circuiting the main electrode of said transistor.

9. Apparatus for testing a transistor having a control electrode and a pair of main electrodes for reverse biased second breakdown comprising:
an inductor;
means for connecting a current source and said inductor across the main electrodes of said transistor;
at least one of said inductor and said current source being variable;
means for applying a reverse bias between said control electrode and one of said main electrodes;
means for applying pulses in opposition to said reverse bias between said control electrode and said one main electrode to render said transistor conductive during said pulses whereby current flows from said current source through said inductor and the main electrodes of said transistor during said pulses and whereby a test voltage is induced across said inductor and applied across main electrodes at the end of said pulses, a radio frequency noise appearing between said control electrode and one of said main electrodes upon occurrence of reverse biased second breakdown of said transistor;
an oscillation detector;
means for applying said radio frequency noise appearing at said control electrode to said oscillation detector; said oscillation detector providing an output pulse in response to said radio frequency noise; and
means responsive to said output pulse for applying a short circuit to said main electrodes for disabling said source of periodic pulses and for disabling said current source.

10. Apparatus for testing a transistor having a control electrode and a pair of main electrodes for reverse biased second breakdown comprising:
an inductor;
means for connecting a current source and said inductor across the main electrodes of said transistor;
at least one of said inductor and said current source being variable;
means for applying a reverse bias between said control electrode and one of said main electrodes;
means for applying pulses in opposition to said reverse bias between said control electrodes and said one main electrode to render said transistor conductive during said pulses whereby current flows from said current source through said inductor and the main electrodes of said transistor during said pulses and whereby a test voltage is induced across said inductor and applied across said main electrodes at the end of said pulses, a radio frequency noise appearing between said control electrode and one of said main electrodes upon occurrence of reverse biased second breakdown of said transistor;
a normally disabled oscillation detector;
means responsive to said test voltage for enabling said oscillation detector;
means for applying said radio frequency noise appearing at said control electrode to said oscillation detector; said oscillation detector when enabled providing an output pulse in response to said radio frequency noise; and
means responsive to said output pulse for applying a short circiut to said main electrodes, for disabling said source of periodic pulses and for disabling said current source.

11. Apparatus for testing a transistor having a control electrode and a pair of main electrodes for reverse biased second breakdown comprising:
an inductor;
means for connecting a current source and said inductor across the main electrodes of said transistor;
at least one of said inductor and said current source being variable;
means for applying a reverse bias between said control electrode and one of said main electrodes;
means for applying pulses in opposition to said reverse bias between said control electrode and said one main electrode to render said transistor conductive during said pulses whereby current flows from said current source through said inductor and the main electrodes of said transistor during said pulses and whereby a test voltage is induced across said inductor and applied across said main electrodes at the end of said pulses, a radio frequency noise appearing between said control electrode and one of said main electrodes upon occurrence of reverse biased second breakdown of said transistor;
a normally disabled oscillation detector;
means responsive to said test voltage for enabling said oscillation detector;
means for applying said radio frequency noise appearing at said control electrode to said oscillation detector; said oscillation detector when enabled providing an output pulse in response to said radio frequency noise; and
means responsive to said output pulse for applying a short circuit to said main electrodes.

12. Apparatus for testing a transistor having a control electrode and a pair of main electrodes for reverse biased second breakdown comprising:
an inductor;

means for connecting a current source and said inductor across the main electrodes of said transistor;

at least one of said inductor and said current source being variable;

means for applying a reverse bias between said control electrode and one of said main electrodes;

means for applying pulses in opposition to said reverse bias between said control electrode and said one main electrode to render said transistor conductive during said pulses whereby current flows from said current source through said inductor and the main electrodes of said transistor during said pulses and whereby a test voltage is induced across said inductor and applied across said main electrodes at the end of said pulses, a radio frequency noise appearing between said control electrode and one of said main electrodes upon occurrence of reverse biased second breakdown of said transistor;

a normally disabled oscillation detector;

means responsive to said test voltage for enabling said oscillation detector;

means for applying said radio frequency noise appearing at said control electrode to said oscillation detector; said oscillation detector when enabled providing an output pulse in response to said radio frequency noise; and means responsive to said output pulse for removing said test voltage from said main electrodes.

13. Apparatus for testing a transistor having a control electrode and a pair of main electrodes for reverse biased second breakdown comprising:

an inductor;

means for connecting a current source and said inductor across the main electrodes of said transistor;

at least one of said inductor and said current source being variable;

means for applying a reverse bias between said control electrode and one of said main electrodes;

means for applying pulses in opposition to said reverse bias between said control electrode and said one main electrode to render said transistor conductive during said pulses whereby current flows from said current source through said inductor and said main electrodes of said transistor during said pulses and whereby a test voltage is induced and applied across said main electrodes at the end of said pulses, a radio frequency noise appearing between said control electrode and one of said main electrodes upon occurrence of reverse biased second breakdown of said transistor;

an oscillation detector;

means for applying said radio frequency noise appearing at said control electrode to said oscillation detector, said oscillation detector providing an output pulse in response to said radio frequency noise;

a silicon controlled rectifier having a pair of main electrodes and a control electrode, said main electrodes of said silicon controlled rectifier being connected respectively to the main electrodes of said transistor; and means responsive to said output pulse for applying a voltage to the control electrode of said silicon controlled rectifier to render it conductive.

14. Apparatus for testing a transistor having a control electrode and a pair of main electrodes for reverse biased second breakdown comprising:

an inductor;

means for connecting a current source and said inductor across the main electrodes of said transistor;

at least one of said inductor and said current source being variable;

means for applying a reverse bias between said control electrode and one of said main electrodes;

means for applying pulses in opposition to said reverse bias between said control electrode and said one main electrode to render said transistor conductive during said pulses whereby current flows from said current source through said inductor and said main electrodes of said transistor during said pulses and whereby a test voltage is induced and applied across said main electrodes at the end of said pulses, a radio frequency noise appearing between said control electrode and one of said main electrodes upon occurrence of reverse biased second breakdown of said transistor;

a normally disabled oscillation detector;

means responsive to said test voltage for enabling said oscillation detector;

means for applying said radio frequency noise appearing at said control electrode to said oscillation detector, said oscillation detector when enabled providing an output pulse in response to said radio frequency noise;

a silicon controlled rectifier having a pair of main electrodes and a control electrode, said main electrodes of said silicon controlled rectifier being connected respectively to the main electrodes of said transistor; and means responsive to said output pulse for applying voltage to the control electrode of said silicon controlled rectifier to render it conductive.

15. Apparatus for testing a transistor having a control electrode and a pair of main electrodes for reverse biased second breakdown comprising:

an inductor;

means for connecting a current source and said inductor across the main electrodes of said transistor;

at least one of said inductor and said current source being variable;

means for applying a reverse bias between said control electrode and one of said main electrodes;

means including a source of periodic pulses for applying pulses in opposition to said reverse bias between said control electrode and said one main electrode to render said transistor conductive during said pulses whereby current flows from said current source through said inductor and said main electrodes of said transistor during said pulses and whereby a test voltage is induced and applied across said main electrodes at the end of said pulses, a radio frequency noise appearing between said control electrode and one of said main electrodes upon occurrence of reverse biased second breakdown of said transistor;

a normally disabled oscillation detector;

means responsive to said test voltage for enabling said oscillation detector;

means for applying said radio frequency noise appearing at said control electrode to said oscillation detector, said oscillation detector when enabled providing an output pulse in response to said radio frequency noise;

a sicilon controlled rectifier having a pair of main electrodes and a control electrode, said main electrodes of said silicon controlled rectifier being connected respectively to the main electrodes of said transistor;

means responsive to said output pulse for applying a voltage to the control electrode of said silicon controlled rectifier to render it conductive;

relay means responsive to said output pulse for applying a short circuit across said silicon controlled rectifier after said silicon controlled rectifier has been rendered conductive;

means responsive to said output pulse for disabling said source of periodic pulses; and means responsive to said output pulse for disabling said source of current.

16. In a test instrument for testing a transistor having a pair of main electrodes and a control electrode for reverse biased second breakdown comprising;

a variable current source;

a variable inductor;

means to connect said current source, said variable inductor and said main electrodes in tandem;

means to apply reverse bias to said control electrode with respect to one of said main electrodes sufficient to block the conductivity of said transistor;

means including an astable multivibrator for applying pulses of currents having a steep back or trailing edge in the forward direction to said control electrode with respect to said one main electrode of sufficient amplitude to render said transistor conductive whereby a high test voltage is induced across said transistor at the occurrence of steep back trailing edge;

means to increase at least one of the inductance of said inductor and said current flow to cause increase of said test voltage whereby a radio frequency noise appears at said control electrode with respect to said one of said main electrodes at occurrence of reverse biased second breakdown;

means for applying said noise to a normally disabled oscillation detector;

means for applying the voltage applied to said transistor to said oscillation detector to enable it, whereby said oscillation detector produces an output pulse in response to said radio frequency noise when enabled;

a normally nonconductive electronic device having main electrodes connecting respectively to said main electrodes of said transistor; and means including a monostable multivibrator and responsive to said output pulse for rendering said electronic device conductive to thereby remove said test voltage from said transistor main electrodes.

17. In a test instrument for testing a transistor having a pair of main electrodes and a control electrode for reverse biased second breakdown comprising:

a variable current source;

a variable inductor;

means to connect said current source, said variable inductor and said main electrodes in tandem;

means to apply reverse bias to said control electrode with respect to one of said main electrodes sufficient to block the conductivity of said transistor;

means including an astable multivibrator for applying pulses of currents having a steep back or trailing edge in the forward direction to said control electrode with respect to said one main electrode of sufficient amplitude to render said transistor conductive whereby a high test voltage is induced across said transistor at the occurrence of said steep back trailing edge;

means to increase at least one of the inductance of said inductor and said current flow to cause increase of said test voltage whereby a radio frequency noise appears at said control electrode with respect to said one of said main electrodes at occurrence of reverse biased second breakdown;

means for applying said noise to a normally disabled oscillation detector;

means for applying the voltage applied to said transistor to said oscillation detector to enable it, whereby said oscillation detector produces an output pulse in response to said radio frequency noise when enabled;

a normally nonconductive electronic device having main electrodes connecting respectively to said main electrodes of said transistor;

means including a monostable multivibrator and responsive to said output pulse from rendering said electronic device conductive to thereby remove said test voltage from said transistor main electrode;

and means responsive to said monostable multivibrator and including a bistable multivibrator for preventing the application of said current pulses to said control electrode and to disable said current source.

References Cited

UNITED STATES PATENTS 3,054,954  9/1962  Boscia _____ 324—158

RUDOLPH V. ROLINEC, *Primary Examiner.*

E. L. STOLARUN, *Assistant Examiner.*